Feb. 20, 1951 J. R. BAYSTON 2,542,891
ICE-MAKING MACHINE
Filed April 12, 1946 3 Sheets—Sheet 1
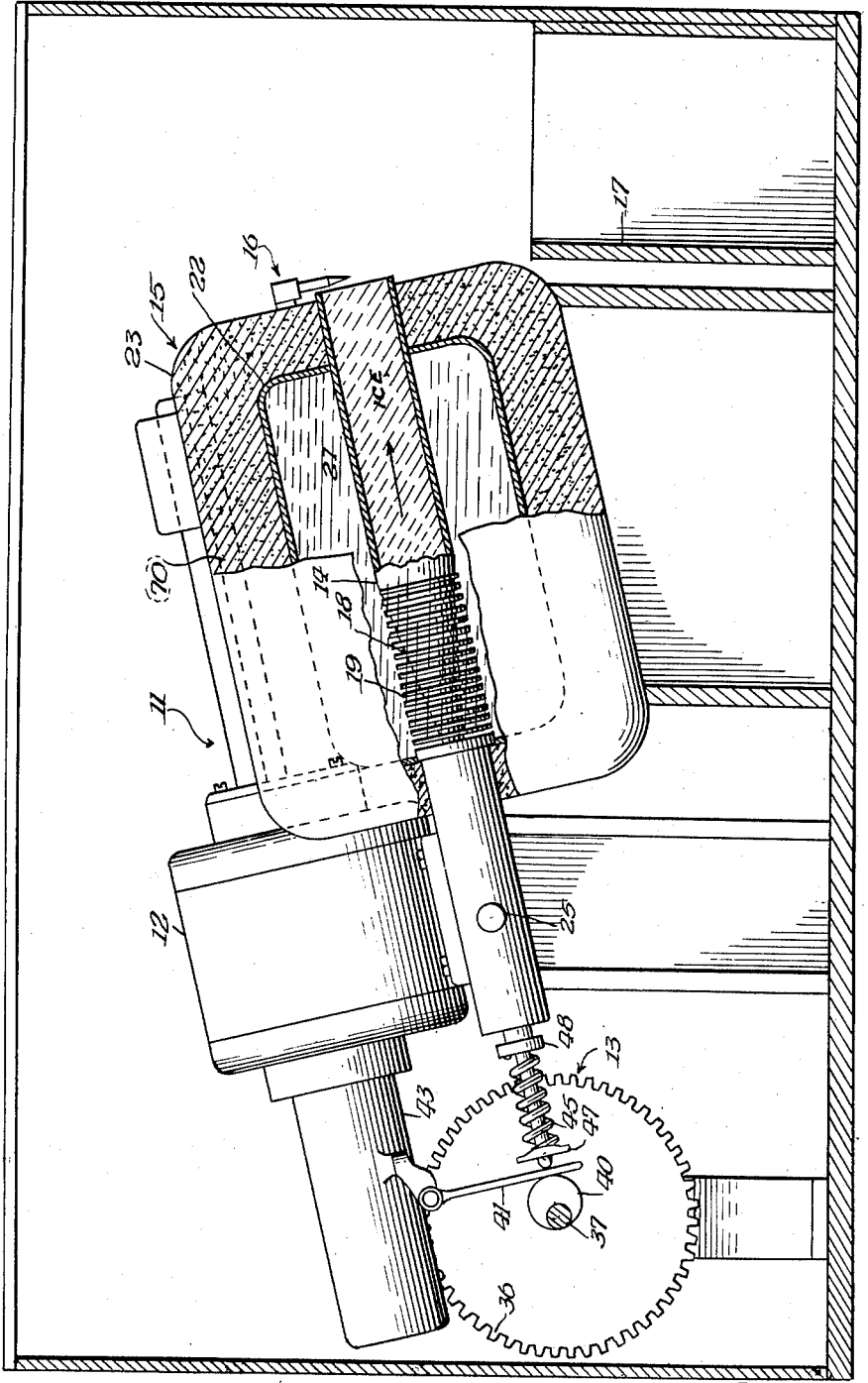
Inventor
John R Bayston
By: Clarence J Loftus atty.

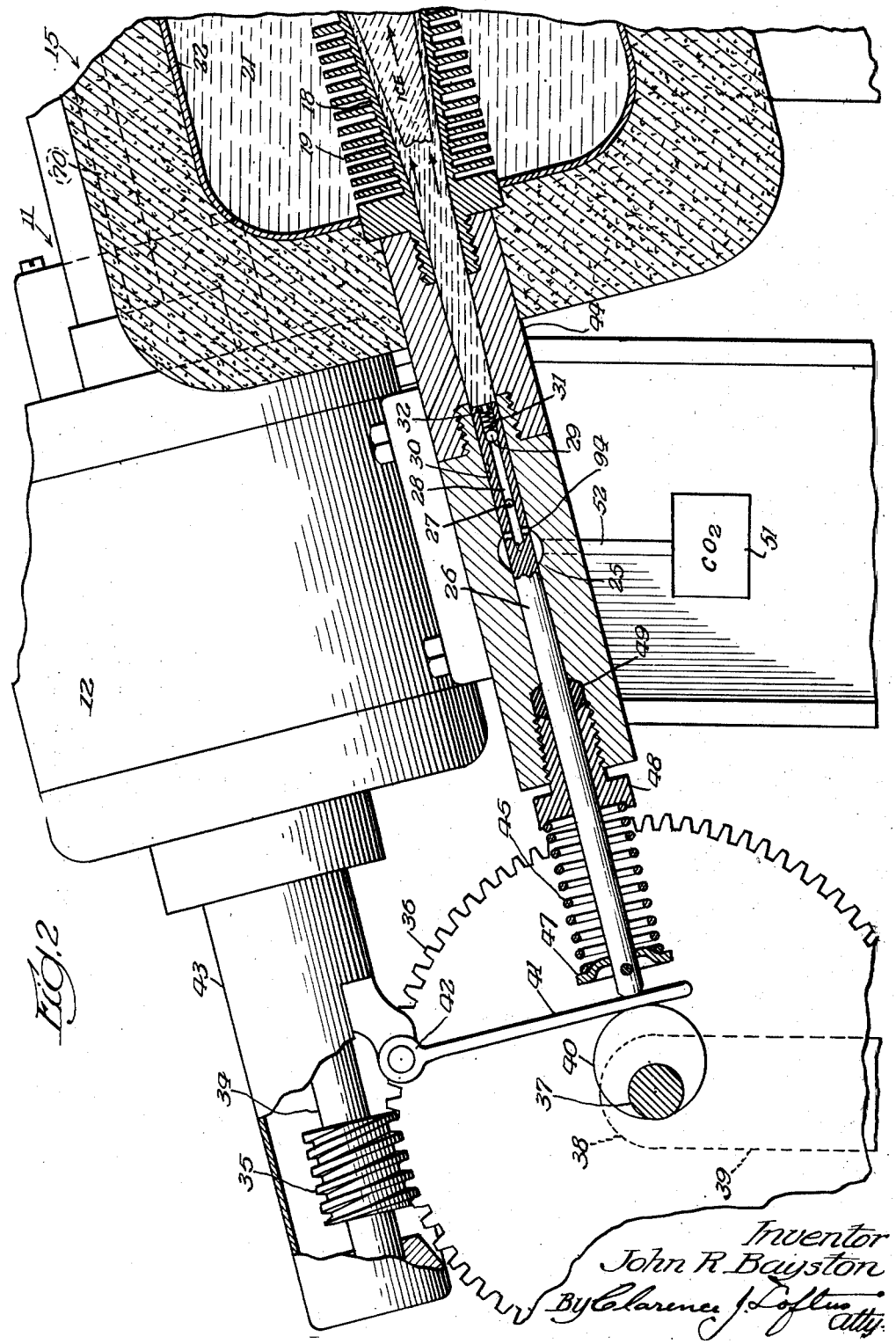

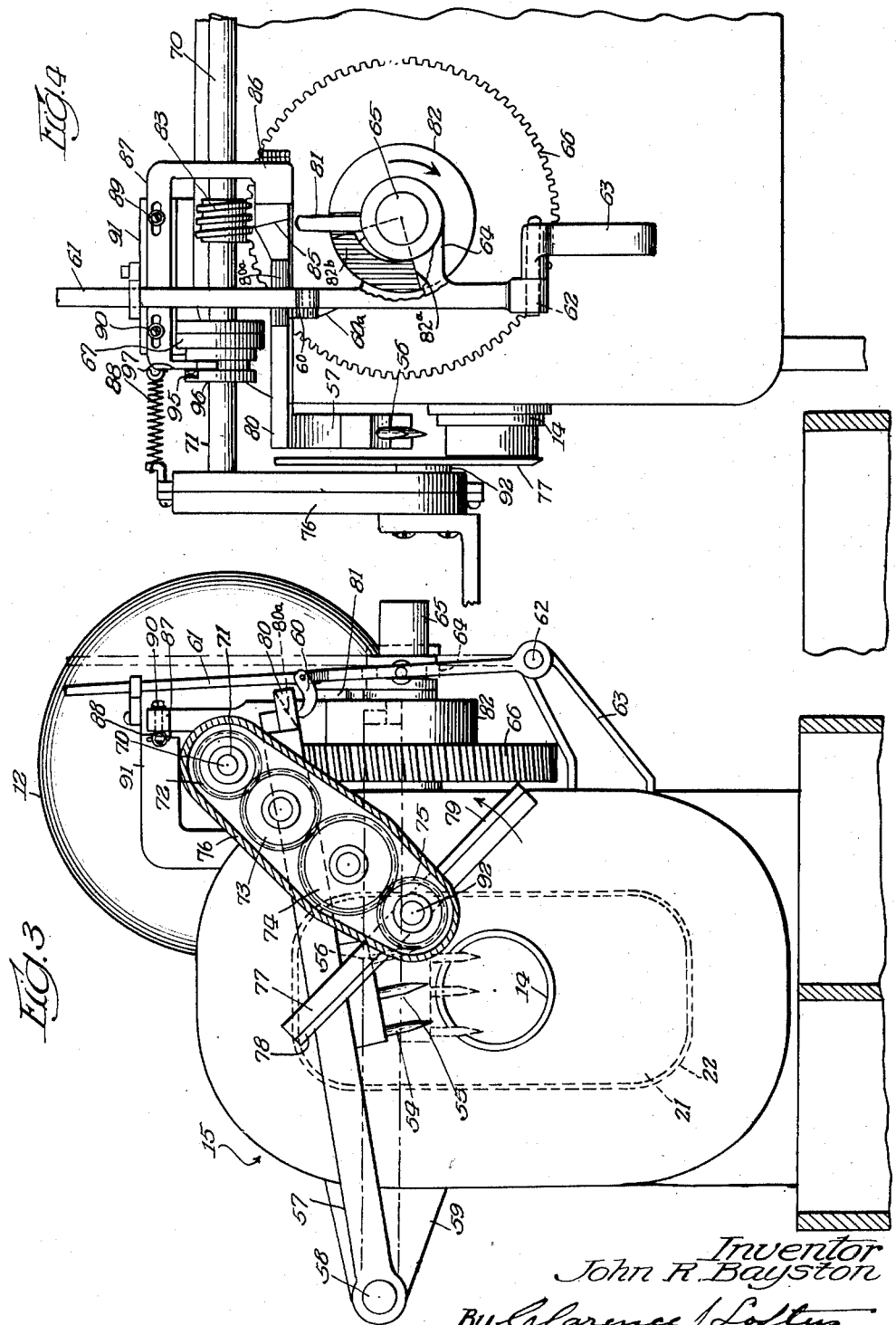

Patented Feb. 20, 1951

2,542,891

UNITED STATES PATENT OFFICE 2,542,891

ICE-MAKING MACHINE

John R. Bayston, Chicago, Ill., assignor, by mesne assignments, to Icecrafter Trust, a trust comprised of John R. Bayston, Van Nuys, and Bernidine B. Oliver, North Hollywood, Calif., and Ward M. Vanderpool, Rockford, Ill., trustees Application April 12, 1946, Serial No. 661,679

9 Claims. (Cl. 62—106)

The present invention relates to a novel machine and process for changing a liquid substance to its solid state and, specifically, for manufacturing ice.

According to conventional ice manufacturing practices, the ice is frozen in large cakes, 300 pounds being a preferred weight. The cakes are placed in a steam bath and removed from the freezing containers and the ice so removed, is hauled to the consumers' establishments. Then it is generally manually cut to the proper size and placed in a refrigerator. In the usual method of preparing ice cubes for the cooling of individual beverage items, the cakes of ice are broken up by saws and cutters at a central ice plant, then sacked and delivered to the consumer. A considerable proportion of ice is lost by melting during the interval between manufacture and delivery.

It is therefore an object of my invention to provide an ice-manufacturing machine which may be used with efficiency at the place where the ice is consumed, which in this manner avoids delivery costs, melting losses, and dispenses with the steaming process. Such a machine should at the same time be sufficiently economical to warrant individual installations as opposed to the usual practice of purchasing from a centralized manufacturing and distributing system.

A related problem which arises in beverage-serving establishments is presented by the necessity of maintaining bottled carbonated water at a relatively low pressure. Safety does not permit a high degree of carbon-dioxide saturation in bottled carbonated water. However, when the water is solidified, a high saturation is permissible. It is also an object of my invention to provide a method and machine for making carbonated ice and at the same time maintaining a high degree of carbon dioxide concentration.

My novel ice-extruding machine and process are premised on two scientific principles, which, so far as I am aware, have not heretofore been practically applied to the manufacture of ice and exploited in avoiding the disadvantages and limitations of prior-art machines and methods.

Other advantages and capabilities of my invention will become apparent from a description of the accompanying drawings in which:

Fig. 1 is a front elevational view, partly in section, showing a preferred embodiment of ice-manufacturing machine in accordance with my invention;

Fig. 2 is a longitudinal sectional view, showing the details of the water and carbon gas inlets, the intermittently operating pressure-increasing means for subjecting the water to regelation, the tapered freezing tube and the brine container included in the Fig. 1 embodiment;

Fig. 3 is an end elevational view of my improved ice-manufacturing machine, showing the novel mechanism which I have provided for selectively breaking or shaving the manufactured ice; and Fig. 4 is a rear elevational view showing further details of the selective ice breaking and shaving arrangement.

My machine is of utility in freezing any liquid of the type which expands when freezing, but it is particularly applicable to ice making and is described in that connection.

Referring now specifically to Figs. 1 and 2, there is shown a novel ice-making machine 11, in accordance with my invention. It comprises a driving motor 12, a periodically operating pressure-increasing means generally indicated at 13, a tapering freezing chamber or tube 14, a brine chamber generally indicated at 15, an ice-breaking arrangement generally indicated at 16, and a bin 17. The overall operation of the machine is such that water supplied to the smaller diameter or apex end of the conical portion of tube 14 is delivered as ice at the larger end thereof, broken or shaved and deposited in bin 17.

The freezing chamber 14 has a tapered portion 18, that being one of the central features of my invention. This tube is provided with a number of fins 19, so that it presents a very large contact surface to the cooling brine 21. This brine is continuously circulated and maintained at a very low temperature by any conventional pumping system (not shown). Specific description of such pumping system is not herein deemed necessary because many such arrangements are known to the art and none is per se claimed herein.

This brine is circulated in a metallic container 22 and the container is confined within a cork insulating jacket 23. Elements 21, 22, and 23 constitute means for maintaining the tube 14—18—19 at the freezing point of the water to be frozen.

My machine also includes means for maintaining at the intake end of chamber 14 a supply of water to be frozen. Water is introduced under pressure at water inlet chamber 25 and is continuously available thereat. Piston 26 is so arranged that either its transversely cut water ports 27 or 94 are in registry with chamber 25, so that water flows under pressure from chamber 25 through ports 27 or 94, depending on the position of piston 26, then through the concentric water channel 28 in the piston and finally into tube 14, overcoming the spring pressure of ball check valve 29, adapted to seat on the annular shoulder 30 under tension of spring 31 bearing against the washer 32. It will thus be seen that water flows into tube 14, in the direction indicated by the arrows in Fig. 2, during the whole of each retraction of piston 26, either ports 27 or ports 94 always being in registry with chamber 25.

Another very important feature of my invention resides in the means for intermittently and progressively subjecting the water near the intake end of tube 14 to increased pressure, whereby its freezing point is reduced and it gives off heat by regelation. This means comprises the piston 26 and the mechanism for periodically advancing the piston (increasing pressure) and retracting the piston (relieving pressure).

The motion train begins with the shaft 34 of motor 12. Secured to that shaft is a worm 35, which continuously drives a worm wheel 36 rotatably mounted on shaft 37. This shaft is journaled in a bearing 38, secured to a suitable mounting 39, and it carries an eccentric 40. The eccentric bears on a link 41, pivoted at 42 to the housing 43 of shaft 34. The link in turn bears on the lower end of piston 26. The operation of this mechanism is such that the head of piston 26 is advanced in cylinder 44 once for every rotation of worm wheel 36. When the piston is so advanced the pressure on the water at the intake end of the cooling tube 14 is increased. When the piston is retracted this pressure is relieved. Retraction of the piston is effected by a compression spring 45, concentric with piston 26 and confined between washer 47 and cylinder cap 48. Washer 47 is rigidly secured to the end of the piston and cap 48 is screwed tightly into cylinder 44. The cap bears heavily on packing 49 and assures a water-tight fit between cylinder and piston. Leakage of the supply of water from cylinder 44 is prevented by this water-tight fit, and leakage of water from tube 14 back to channel 28 is prevented by the one-way action of valve 29—32.

The operation of my machine is based on the scientific principles of regelation and the expansion of ice during freezing, which principles are well known in the art and are fully explained in many elementary texts (see pages 251 and 249 of the publication entitled "College Physics," by Hausmann & Slack, D. Van Nostrand Company, Incorporated, New York). A first charge of water is introduced into tube 14. As the water freezes and gives off its heat to the cooling liquid 21 it expands. The progressively increasing interior cross-section portion 18 of tube 14 and the forces of expansion of the freezing water cause the ice to move toward the delivery end of the tube. An additional charge of water is injected as piston 26 is retracted. The piston is then advanced so that an increased pressure is exerted on the water at the intake end of tube 14. This pressure tends to melt the lower portion of the ice, since pressure reduces the freezing point of a substance, and that portion rapidly gives off heat. When the pressure is removed by the retraction of the piston, the second-mentioned charge of water freezes, the freezing point of the first rises and it refreezes by regelation. Then the cycle of operation is repeated. The brine 21 tends at all times to freeze all water within the chamber 14. The tapering shape of the tube 14 and the upward thrust of piston cause the ice to progress toward the delivery end at all times. As each charge refreezes by regelation when the increased pressure is removed, it expands and tends to rise. As pressure is exerted on each charge, its freezing point is reduced and it gives off heat. Thus the process of regelation and the action of the cooling brine cooperate to produce ice while the shape of the tube and the pressure of the piston cooperate to deliver that ice. As the cycles are repeated, ice is extruded from the delivery end of the container.

In the production of carbonated ice the same basic machine and process are employed. A supply of carbon dioxide ($CO_2$) 51 is provided. The outlet of this supply communicates with water-inlet chamber 25 through a check valve controlled conduit 52. The water in chamber 25 is charged with carbon dioxide when valve 52 is appropriately adjusted. The water entering tube 14 may be highly charged with this gas for the reason that cylinder 44 and tube 14 are made of metal and have many times the strength of the usual carbonated water bottle. Whenever the piston exerts its upward stroke to develop high pressure, the water within tube 14 becomes highly saturated with gas. The water freezes in that condition. Since a greater pressure than is permissible in the storage of bottled carbonated water is attained, a higher degree of gas concentration may be obtained. Although a low carbon concentration may be obtained if desired, this machine and process have particular utility in producing ice having an unusually high carbon dioxide concentration. They thus make practicable the serving of beverages that have a considerably greater appeal to epicureans than the usual beverages compounded of a mixture of ice and carbonated water. At several atmospheres of pressure several parts by volume of carbon dioxide may be used for each part of water by volume.

The machine also comprises means for breaking the ice upon its delivery from the open end of tube 14. The ice emerges in a pulsating but continuous stream. The breaking means comprises a set of cutting knives 54, 55 and 56, the cutting position of which is shown in dotted outline in Fig. 3. Immediately after one or more pulsations of the ice stream and the emergence of each successive portion of ice from the delivery end of tube 14, the knives fall from a position slightly below that indicated in full lines in Fig. 3 to that indicated in dotted lines, shearing off the disc of ice and slicing it into rectangular portions. The knives are secured to an arm 57, pivoted at 58 on a suitable mounting 59. Arm 57 is L-shaped so that it is tilted upwardly as the base of the L 80 is upwardly displaced. The arm is periodically upwardly displaced in timed relationship to the pulsating ice stream, indicated at I by a cam 81, rigidly secured to a notched wheel 82 on a shaft 65. This cam periodically lifts the arm and knives 54—56 upwardly as shaft 65 rotates in a clockwise direction (Fig. 4) and permits it to drop onto the anvil-like portion 82a provided by the notched portion 82b of the wheel. Also secured to the shaft is a worm wheel 66, driven by a worm 83, and the worm in turn is mounted on shaft 70 for rotation by motor 12. Worm wheel 66, worm 83, shaft 70, cam 81, eccentric 40, worm wheel 36, worm 35 and shaft 34 are so proportioned that the knives 54—56 fall to the cutting position immediately following the delivery of each section of ice and rise during the delivery of the succeeding section.

It is sometimes desirable to shave the ice rather than to break it. I provide a mechanism for serving this purpose and means for disabling the breaking mechanism while the shaving mechanism is in operation. When the shaving mechanism is in operation, the knives 54—56 are maintained in positions clear of the tube 14 and above their normal working position by a lug 60 secured to a lever 61, lug 60 holding base 80 of arm 57 in an elevated position. Lever 61 is pivoted at 62 to a suitable support 63. When the lever is in the position shown by the full lines in Fig. 3, the shaving mechanism is in operation and the breaking mechanism is not. The converse is true when the lever is in the position indicated by the dotted lines. The lever has an ear 64 apertured to receive shaft 65 in such manner that free movement of lever 61 is permitted.

The setting of lever 61 to the "in" position not only disables the ice breaking means but it also closes a clutch 67 and a mechanical motion train from motor 12 through shaft 70 and clutch 67 to shaft 71. This clutch is closed in the following manner: As lever 61 is pushed inwardly, cam 81 lifts the cam portion 80a of base 80 to such a position that it passes over the top of hinged lug 60. The underside of lug 60 is curved in order to facilitate this passage. Lug 60 is so shaped and disposed that continued inward movement of lever 61 causes base 80 to be cammed upwardly by lug 60 to such an extent that cam surface 85 formed on the end of base 80 engages cam surface 86 on the end of clutch yoke 87 and cams it into the clutch-engaging position (to the right as seen in Fig. 4) against the resistance of spring 88, which normally urges the clutch to an open position. It will be noted that the base 80 is then in such a position that it clears cam 81. Lug 60 is appropriately shaped for this purpose and is held in its supporting position by the stop 69a. Clutch yoke 87 is secured by bolts 89 and 90 to a suitable foundation 91, the bolts passing through slots in the yoke to permit longitudinal movement of the yoke.

Shaft 71 drives a set of gears 72, 73, 74, and 75, suitably mounted within gear housing 76. A knife 77 having cutting edges 78 and 79 is secured for counterclockwise rotation (as viewed in Fig. 3) on the shaft 92 of gear 75. The closing of clutch 67 causes knife 78 to be rotated by the mechanical power of the same motor that drives piston 26. A suitable rate of rotation is 175 revolutions per minute.

When lever 61 is retracted, lug 60 clears the base 80 of arm 57 and knives 54—56 are again so operated as to break the ice delivered by tube 14. Moreover, clutch 67 is open and knife 77 then remains stationary. End 97 of yoke 87 slips into depression 95 in clutch member 96 to stop the shaving member in the position shown in Fig. 3.

Any suitable arrangement for depositing the shaved and/or broken ice in bin 17 may be provided. Channels may be set up for segregating the ice cubes and the shaved ice. Many of such expedients are within the mechanical skill of those informed in this art so that a showing of such arrangement herein is considered unnecessary.

While there has been shown what is presently considered to be a preferred embodiment of my novel ice-making machine, including features whereby ice may be carbonated or broken into cubes or shaved, it will be obvious to those skilled in that art that various substitutions of equivalents may be made therein without departing from the true spirit of the invention and it is, accordingly, intended in the appended claims to cover all such modifications as fall within the true scope of the invention and without the proper scope of the prior art. It will be noted that my ice-making machine is suitable for the production of ice charged with any gas and for solidifying and substance which expands when it freezes.

Having thus described my invention, I claim:

1. A machine for continuously converting liquids into ice, comprising a hollow freezing chamber having a progressively increasing interior cross section from the liquid-intake end toward the ice-discharge end, with a portion of the chamber having substantially uniform interior cross section at the ice discharge end whereby the pressure set up as the ice is formed automatically forces the ice out of the discharge end in a continuous solid stream, means including a coolant container surrounding said chamber for maintaining a freezing temperature in said chamber, a reciprocating piston mounted adjacent said intake end for intermittently and progressively increasing the pressure on the liquid near the intake end of said chamber, and means including a valve mounted on said piston and a longitudinal channel therewithin for supplying to said chamber a quantity of liquid during each piston cycle.

2. A machine for continuously converting a liquid and a gas into charged ice, comprising a hollow freezing chamber having a progressively increasing interior cross section from the liquid-intake end toward the ice-discharge end whereby the pressure set up as the ice is formed automatically forces the ice out of the discharge end in a continuous solid stream, means for maintaining a freezing temperature in said chamber, means for supplying liquid to said chamber near the intake end, means for charging said liquid with gas, and means for intermittently and progressively increasing the pressure on the charged liquid near the intake end of said chamber.

3. In an ice-making machine of the character described, the combination of, means comprising a reciprocating pump for periodically and progressively increasing the pressure on the liquid, motor means for driving the first-mentioned means, and means driven by said motor for dividing the solidified product produced by the refrigerator.

4. An ice-making machine for continuously converting liquids which expand when freezing into ice comprising a hollow exteriorly finned freezing chamber having a progressively increasing interior cross section from the liquid-intake end toward the ice-discharge end whereby the pressure set up as the ice is formed automatically forces the ice out of the discharge end in a continuous solid stream, means including a circulating-brine container disposed concentrically of said chamber for maintaining a freezing temperature in said chamber, means comprising a cylindrical extension of said chamber and a reciprocating piston slidably mounted within said chamber for progressively increasing the pressure on the liquid near the intake end of said chamber, means including a valve mounted on said piston and water channel therewithin for periodically injecting liquid into the intake end of said chamber, spring means for maintaining said piston in a normally retracted position, an eccentric motion train for periodically advancing said piston, and a motor for driving said motion train.

5. An ice-making machine in accordance with claim 4, including means for dividing the solidified stream of ice emerging from said chamber and driving means mechanically coupling said dividing means to said motor, whereby to actuate the dividing means in timed relation to the pulsations of said stream of ice.

6. An ice-making machine in accordance with claim 4 and means driven by said motor for shaving said ice.

7. An ice making machine for continuously converting liquids which expand upon freezing into ice, comprising a freezing chamber having a progressively increasing interior cross section from the liquid intake and toward the ice discharge end whereby the pressure set up as the ice is formed automatically forces the ice out of the discharge end in a continuous solid stream, means for maintaining a freezing temperature in said chamber, a cylinder connected with the intake end of said chamber, a source of liquid supply communicating with said cylinder, a piston in said cylinder, and power means for reciprocating said piston to periodically force a charge of liquid from said cylinder into the intake end of said chamber.

8. An ice making machine for continuously converting liquids which expand upon freezing into ice, comprising a freezing chamber having a progressively increasing interior cross section from the liquid intake and toward the ice discharge and whereby the pressure set up as the ice is formed automatically forces the ice out of the discharge end in a continuous solid stream, means for maintaining a freezing temperature in said chamber, a cylinder connected with the intake end of said chamber, a source of liquid supply communicating with said cylinder, a piston in said cylinder, power means for reciprocating said piston to periodically force a charge of liquid from said cylinder into the intake end of said chamber, and a check valve operatively associated with said piston for permitting flow of liquid into said cylinder upon the backstroke thereof and preventing return flow upon the forward stroke thereof.

9. An ice making machine for continuously converting liquids which expand upon freezing into ice, comprising a freezing chamber having a progressively increasing interior cross section from the liquid intake end toward the ice discharge and whereby the pressure set up as the ice is formed automatically forces the ice out of the discharge end in a continuous solid stream, means for maintaining a freezing temperature in said chamber, a cylinder connected with the intake end of said chamber, a source of liquid supply communicating with said cylinder, a piston in said cylinder, and power means for reciprocating said piston within said cylinder, said piston having an internal bore communicating with a source of liquid for receiving a charge of liquid therein, and a check valve in the end of said piston to permit liquid to flow from said bore into said cylinder upon the piston being retracted and be forced from said cylinder into the intake end of said chamber upon the power stroke of said piston.

JOHN R. BAYSTON.

REFERENCES CITED

The following references are of record in the file of this patent:

UNITED STATES PATENTS

| Number | Name | Date |
|---|---|---|
| 191,256 | Riker | May 29, 1877 |
| 2,071,773 | Huber | Feb. 23, 1937 |
| 2,145,773 | Muffly | Jan. 31, 1939 |
| 2,240,463 | Schlumbohm | Apr. 29, 1941 |
| 2,422,772 | Bohn | June 24, 1947 |